INVENTORS
HANS H. AMMANN
LESLIE C. KUN

BY

ATTORNEY

United States Patent Office 3,560,062
Patented Feb. 2, 1971

3,560,062
GAS BEARING ASSEMBLY WITH AUXILIARY BEARING
Leslie C. Kun, Williamsville, and Hans H. Ammann, Hamburg, N.Y., assignors to Union Carbide Corporation, a corporation of New York
Filed Aug. 16, 1968, Ser. No. 753,157
Int. Cl. F16c *17/16, 21/100*
U.S. Cl. 308—9                    9 Claims

ABSTRACT OF THE DISCLOSURE

Gas bearing damage may be minimized by attaching auxiliary bearings and restraining means to the normally stationary gas bearing member which restraining means permits auxiliary bearing rotation should the gas bearing fail. Rotor driving force termination may commence when auxiliary bearing rotation begins.

BACKGROUND OF THE INVENTION

This invention relates to auxiliary bearings in association with gas-lubricated bearings or gas-bearing supported assemblies for rotating members.

It has long been recognized that gas-lubricated bearing systems potentially offer important advantages over liquid-lubricated rotating systems. For example, the latter are limited to relatively low rotational speeds; high speeds cause overheating and failure of the bearing. Liquid systems often present a problem of contamination of the process fluid with lubricant, as for example in food processing machinery. Also, the lubricant itself may become contaminated, such as with radioactive gases in nuclear equipment. Another limitation of liquid-lubricating systems is possible freezeup in low temperature service, e.g. expansion turbines, or chemical decomposition at high temperatures. All of these disadvantages are avoidable in gas-lubricated bearing support systems.

Unfortunately, in gas bearing systems, if a malfunction of the primary gas bearing occurs for any reason, such an excessive rotor imbalance, shock inputs, foreign matter contamination of lubricating gas, or loss of lubricating gas supply, the kinetic energy of the rotor is harmfully expended through rubbing of the close fitting precision gas bearing surfaces. Various means have been proposed in the prior art to minimize the severity of this kind of damage. These include bearing surfaces supported by flexible rubber which shears and provides an auxiliary bearing surface capable of withstanding a limited amount of rotation when the bearing surfaces rub against each other for any reason. Rubber O-rings have been suggested for employment in this type of system. Another method utilizes a composite bearing comprising a gas bearing with a ball bearing which is free to rotate at all times. While these arrangements are workable they have serious disadvantages. The rubber supported bearing surface requires high torque values to shear the bond; rubber must be replaced after each use and only limited rotation is possible. The ball bearing which is free to rotate at all times does not guarantee protection of the gas bearing surfaces because such ball bearing is itself subject to failure due to wear during each startup and shutdown.

It is an object of this invention to provide a gas bearing assembly with a highly reliable auxiliary bearing arrangement to reduce frictional damage to the close fitting precision gas bearing elements should gas bearing failure occur.

Other objects and advantages will be apparent from this description, the appended claims and the drawings.

SUMMARY OF THE INVENTION

In summary, this invention comprises in combination with a gas lubricated bearing assembly having a rotor substantially concentric with a normally stationary member with a gas space therebetween and with a rigid member supporting the stationary member, an auxiliary bearing disposed between the normally stationary member and the rigid support member permitting rotation of the normally stationary member relative to the rigid support member, and a restraining means for resisting rotation of the normally stationary member relative to the rigid support member which is arranged to release said normally stationary member when a torque in excess of a predetermined torque value is applied to the normally stationary member by the rotor whereby the auxiliary bearing accommodates rotation of both the normally stationary member and the rotor. In a preferred embodiment, means are provided for terminating movement of the rotor, as for example rotor driving force termination means which may comprise an electrical cut-off switch for an electrically driven rotor or an inlet fluid cut-off valve for a turbine driven rotor which termination means are responsive to rotation sensing means which may comprise a cam switch or proximity switch arranged to actuate the driving force termination means when rotation of the normally stationary member is sensed. Termination of the rotor driving force insures greater reliability in that the auxiliary bearing thereby experiences minimal running time resulting in reduced probability of auxiliary bearing failure.

This invention may be used in conjunction with gas bearing elastic support means and damping means for improved gas bearing reliability, U.S. Pat. Nos. 3,302,865 and 3,326,453 to L. C. Kun.

Figure 1:
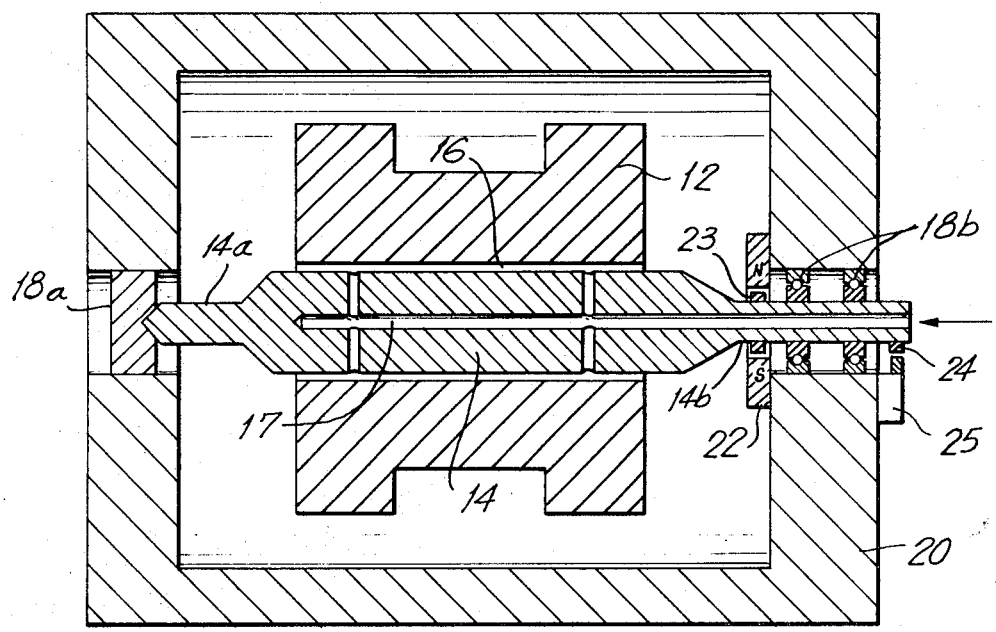
FIG. 1 is an elevation view, taken in cross-section, of a gas lubricated bearing assembly constructed in accordance with this invention.

FIG. 1 illustrates a non-rotative shaft gas bearing configuration wherein the rotor 12 is supported on non-rotative shaft or stationary member 14 by a gas film occupying annular space 16. Shaft 14 is hollow and has necked down portions 14a and 14b at each end which serve as elastic support and damping means. Lubricating gas is supplied to annular space 16 through inner distribution passage 17. Between the shaft ends 14a and 14b and the rigid support means or housing 20 are located auxiliary bearing 18a comprising a needle bearing and bearings 18b comprising ball bearings. Alternative auxiliary bearings may be any desired conventional type such as sleeve bearings or roller bearings.

The auxiliary bearings are prevented from rotating under normal operation of the gas bearing by positive rotation restraining means, which may be either mechanical or magnetic as desired. Such rotation restraining means are illustrated as permanent magnet 22 located proximate to shaft 14 and attached to housing 20. Projections 23 of magnetizable material are attached to shaft 14. Whenever the torque imparted to shaft 14 by rotor 12 exceeds the restraining torque of magnet 22, auxiliary bearings 18a and 18b will permit the normally stationary member, shaft 14, to rotate. A typical restraining torque would be about twice the maximum expected gas bearing running torque. The commencement of such rotation will be sensed by suitable sensing means such as a cam switch or magnetic proximity switch and the rotor driving force terminated by a suitable shutdown device responsive to said sensing means. Alternatively, the rotation restraining means may be a shear pin or wire sized to break whenever a selected torque is developed in the gas bearing, as described above.

A shutdown system for interrupting energy input to the rotor upon rotation of the auxiliary bearing is preferably provided, comprising a rotation sensor associated with the auxiliary bearing and which acts to shut off the driving torque to the unit. This may comprise a cam 24 attached to the auxiliary bearing or normally stationary member and associated with switch 25, so that any rotation of the bearing interrupts a circuit and shuts down the rotor driving force. For a turbine-driven blower arrangement, the shutdown system would close the turbine inlet valve. For an electric motor-driven unit, the shutdown system would act to terminate power to the motor.

Figure 2:
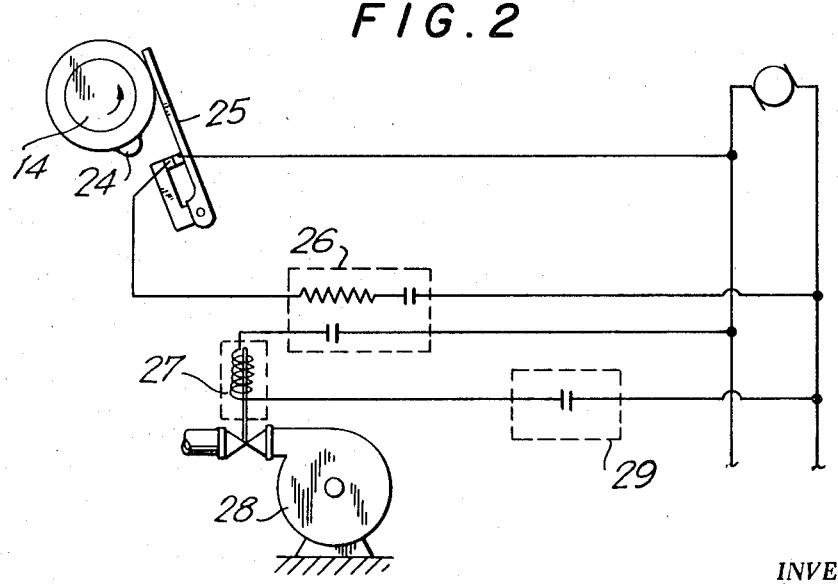
FIG. 2 is a schematic drawing of a shutdown system associated with FIG. 1 and constructed in accordance with this invention.

FIG. 2 is a schematic drawing of a shutdown system as described above. When the shaft 14 commences rotation, cam 24 actuates switch 25 which in turn actuates relay 26 which in turn closes inlet valve 27 of turbine 28. Such a sequence could turn off sources of power other than pressurized gas supplied for driving the rotor. An alternative override switch or valve 29 is supplied for operating convenience. The rotation sensing switch 25 is reset following each use and if desired, a rotor braking device could also be provided and actuated by the rotation sensing means.

Figure 3:
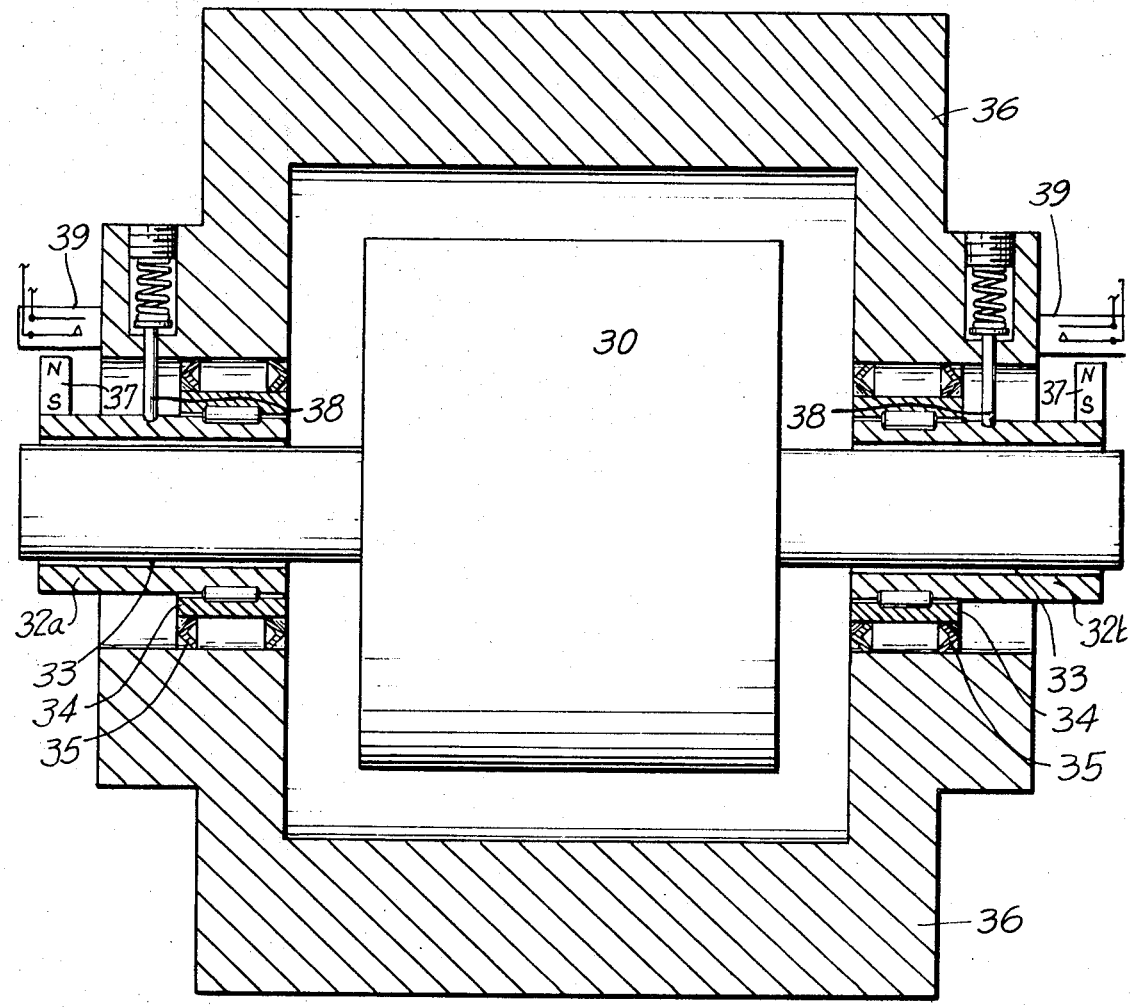
FIG. 3 is an elevation view, taken partially in cross-section, of another embodiment of this invention.

FIG. 3 illustrates another embodiment of this invention wherein a rotative shaft and rotor assembly 30 is supported within normally non-rotative sleeves 32a and 32b by a gas film in annular spaces 33. Attached to or incorporated within bearing sleeves 32a and 32b are auxiliary bearings 34 comprising roller bearings, which in turn may be elastically supported and damped by spring type elements 35 within rigid housing 36. Lubricating gas may be supplied to the gas bearing surfaces through the elastic support and damping means by flexible tubing (not shown), or the bearings may be the hydrodynamic or self-acting type which draw gas from the surrounding environment. Auxiliary bearings 34 are normally restrained against any rotation, such as by a spring-loaded restraining device 38 which is attached rigidly to housing 36. Electrical switch means comprising permanent magnets 37 attached to sleeves 32a and 32b and magnetically actuated switches 39 attached to housing 36 are arranged such that when the inner sleeve of auxiliary bearing 34, i.e. the normally stationary member, begins to rotate permanent magnet 37 is displaced and thereby actuates magnetically actuated switch 39 which in turn actuates a suitable shutdown system. A schematic drawing of such a shutdown system is included as FIG. 2. In that schematic the rotor driving force is shutdown by suitable terminating means 27 responsive to a relay 26 which is actuated by a switch 25 which is in turn responsive to cam 24 rigidly attached to the normally stationary member 14, such that when the normally stationary member 14 begins to rotate cam 24 actuates switch 25 which actuates relay 26 which in turn actuates termination means 27 thereby causing the rotor of turbine 28 to stop. As applied to FIG. 3, the above described cam 24 and switch 25 of FIG. 2 would be replaced in the shutdown system by magnet 37 and magnetically actuated switch 39 respectively.

Figure 4:
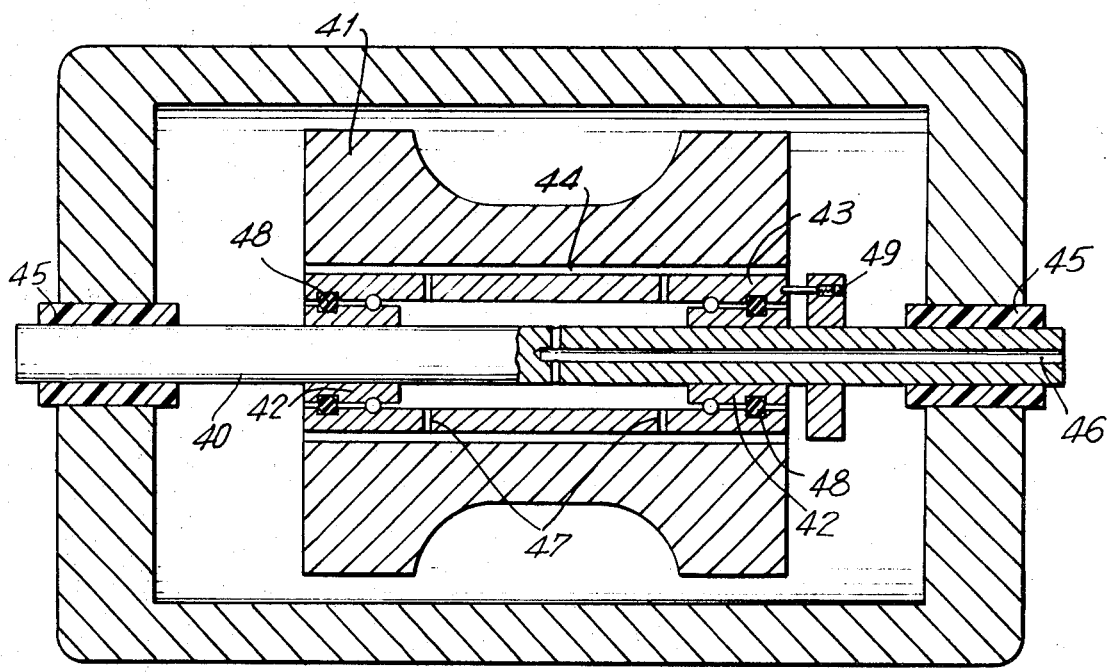
FIG. 4 is an elevation view, taken in cross-section, of another embodiment of this invention.

FIG. 4 illustrates an embodiment of this invention in which the relative positions of the auxiliary bearing and support elements of FIG. 1 have been reversed. FIG. 4 shows auxiliary bearings 42 disposed between normally stationary gas bearing member 43 and the rigid support member or shaft 40, which is elastically supported and damped by means depicted as elements 45 comprising an elastomer having inherent damping properties. The lubricating gas supply is introduced through passage 46 in shaft 40 and passes outwardly through openings 47 to annular space 44. Pressure seals 48 are required to prevent the escape of lubricating gas. Restraining element 49 is attached to shaft 40 and restrains rotation of the normally stationary member 43 around which rotor 41 rotates.

Figure 5:
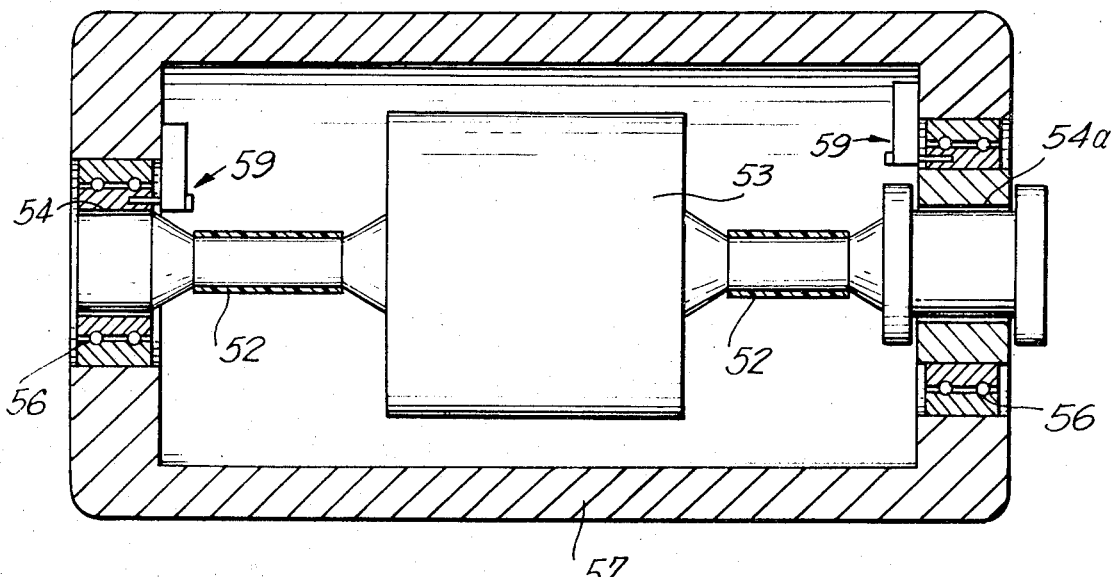
FIG. 5 is an elevation view, taken partially in cross-section, of another embodiment of this invention.

FIG. 5 illustrates a rotative shaft embodiment similar to FIG. 3, but wherein the elastic support and damping means 52 are located between gas bearings 54 and 54a and the major portion of the rotor 53, with the auxiliary bearings 56 located between the gas bearings 54 and the rigid support housing 57. Shear-pin restraining elements 59 are rigidly attached to rigid support housing 57 and restrain rotation of the inner races of auxiliary bearings 56. Note that axial thrust is compensated for by gas bearing 54a.

In a preferred embodiment of this invention a gas bearing comprising a normally non-rotative stationary member damped and elastically supported by means comprising necked down shaft portions interposed between the shaft main body and the supported shaft ends, with a rotor arranged to rotate about such normally non-rotative stationary member or shaft with an annular gas space therebetween in communication with a supply of lubricating gas, in combination with auxiliary bearings disposed between said shaft ends and rigid support means with a restraining means having a predetermined torque value for restraining rotation of the normally stationary member or shaft relative to the rigid support member and arranged to release said normally stationary member when the torque applied to the normally stationary member by the rotor exceeds said predetermined restraining torque value whereby said auxiliary bearing accommodates rotation of both the normally stationary member and the rotor, and in combination with a sensing means arranged to detect rotation of that portion which begins rotation when the predetermined torque is exceeded, which sensing means actuates a shutdown system arranged to terminate the gas bearing rotor driving force and also may actuate a means arranged to decelerate or brake the rotor.

Although preferred embodiments have been described in detail it will be appreciated that other embodiments are contemplated along with modifications of the disclosed features as being within the scope of the invention.

What is claimed is:

1. In combination with a gas-lubricated bearing assembly having a rotor and a normally stationary member concentrically positioned and aligned with a gas space therebetween and a rigid member supporting said normally stationary member, the improvement comprising:
    (a) auxiliary bearing means disposed between said normally stationary member and the rigid support member for rotation of the normally stationary member relative to the rigid support member; and
    (b) rotation restraining means positioned to apply a predetermined torque value to said normally stationary member and restrain rotation thereof relative to the rigid support member.

2. A gas bearing assembly according to claim 1 including means for terminating movement of said rotor, and means for sensing rotation of the normally stationary member and actuating the movement termination means responsive to the sensed rotation.

3. A bearing combination as described in claim 1 wherein the normally stationary member comprises a shaft.

4. A bearing combination as described in claim 1 wherein the normally stationary member comprises at least two sleeves.

5. A bearing assembly as described in claim 2 wherein the bearing assembly supports a turbine rotor and the rotor movement termination means closes the turbine inlet valve.

6. A bearing combination as described in claim 1 comprising in addition elastic support and damping means disposed between the main portion of the normally stationary member and the auxiliary bearing.

7. A bearing combination as described in claim 6 wherein the elastic support and damping means is disposed between the auxiliary bearing and the rigid support member.

8. A bearing combination as described in claim 6 wherein the elastic support and damping means are disposed between the main body of the rotor and the contiguous rotor and normally stationary member surfaces.

9. A bearing assembly as described in claim 2 comprising in addition means arranged to decelerate the rotor responsive to means for sensing rotation of the normally stationary member and actuating the rotor deceleration means responsive to the sensed rotation.

References Cited
UNITED STATES PATENTS 1,053,437   2/1913   Rennerfelt _____ 308—35

MARTIN P. SCHWADRON, Primary Examiner

F. SUSKO, Assistant Examiner

U.S. Cl. X.R.

308—35